UNITED STATES PATENT OFFICE.

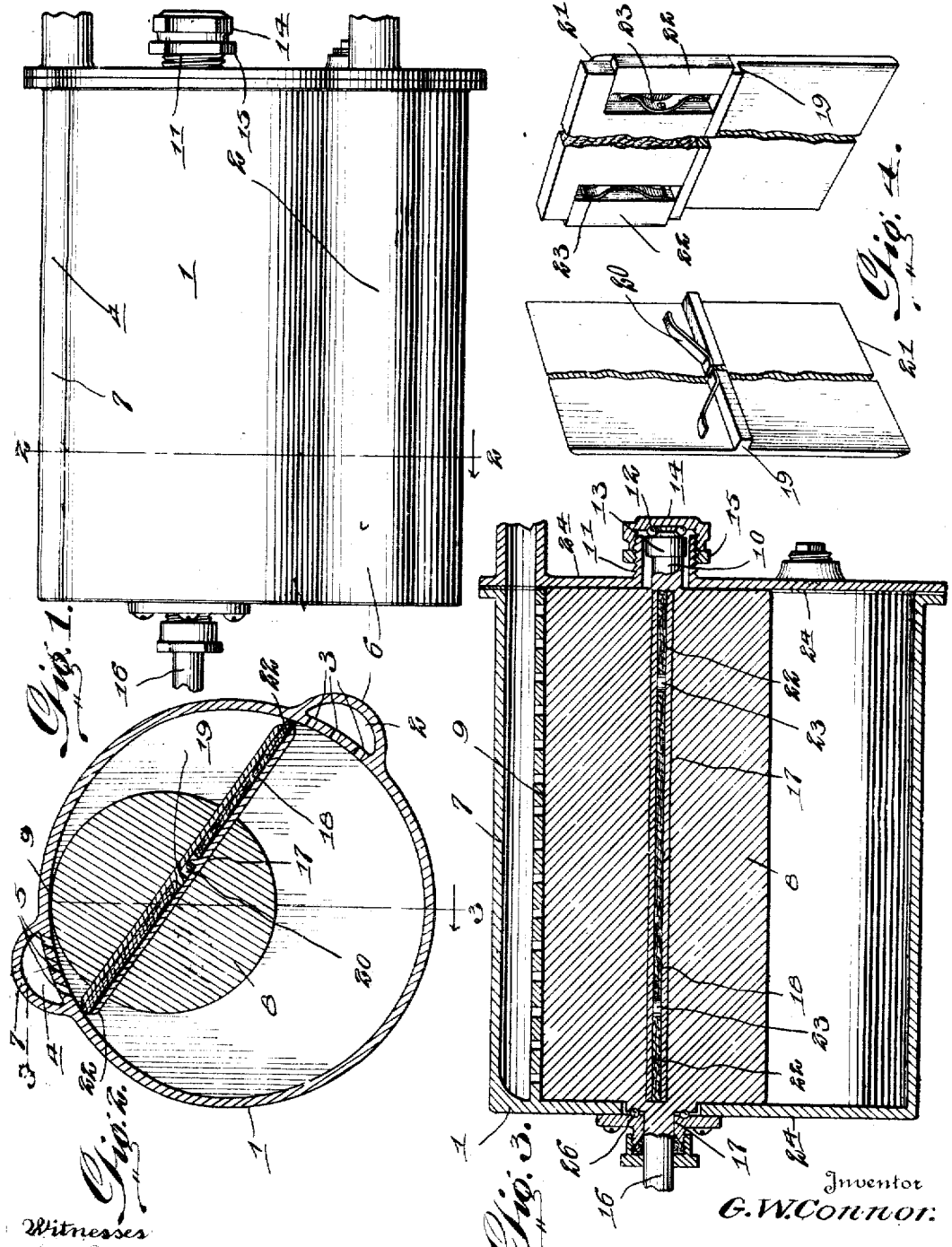

GEORGE W. CONNOR, OF ANDERSON, SOUTH CAROLINA.

ROTARY PUMP.

1,283,089.  Specification of Letters Patent.  Patented Oct. 29, 1918.

Application filed June 26, 1917, Serial No. 177,091. Renewed September 18, 1918. Serial No. 254,678.

*To all whom it may concern:*

Be it known that I, GEORGE W. CONNOR, a citizen of the United States, residing at Anderson, in the county of Anderson and State of South Carolina, have invented new and useful Improvements in Rotary Pumps, of which the following is a specification.

This invention relates to rotary pumps, the object in view being to provide a simple, reliable and quick acting pump of the rotary type, embodying, in combination, a generally cylindrical casing, a rotor therein, and a novel construction and arrangement of pumping blade carried and driven by said rotor in relation to which it has a sliding action, said blade embodying packing means forming a liquid-tight joint between the extreme outer edges thereof as well as the lateral edges of the same.

With the above and other objects in view, the invention consists in the novel construction, combination and arrangement of parts, herein fully described, illustrated and claimed.

In the accompanying drawings:—

Figure 1 is a side elevation of a rotary pump embodying the present invention.

Fig. 2 is a cross section through the same on the line 2—2 of Fig. 1.

Fig. 3 is a diametrical section through the casing on the line 3—3 of Fig. 2.

Fig. 4 is a perspective view of the blade sections disconnected.

The rotary pump contemplated in this invention comprises a substantially cylindrical casing 1 which is stationary and which may be provided with any suitable supporting base. The casing 1 comprises an inlet chamber 2 which communicates with the interior of the casing by means of inlet perforations 3 through which the liquid reaches the interior of the casing.

The casing 1 is provided with a similar outlet chamber 4 which communicates with the interior of the casing 1 by means of perforations 5. The perforations 3 and 5 are in fact formed in the wall of the casing 1, such perforated portions of the casing being covered by substantially semi-cylindrical hoods 6 and 7 as best shown in Fig. 2.

Mounted within the casing 1 is a rotor 8 of considerably smaller diameter than the internal dimensions of the casing 1, said rotor 8 being eccentric with respect to the center of the casing 1 and touching the inner peripheral wall of the casing 1 at a point 9. The rotor 8 is provided at one end with a stud shaft 10 which is received in a tubular bearing extension 11 of the casing 1, a ball thrust bearing 12 being interposed between the enlarged end portion 13 of the stud shaft 12 and a bearing cap 14 which is threaded upon the tubular extension 11 and fixedly secured against working loose by means of a jam nut 15. At its other end the rotor 8 is provided with an extended shaft 16 which passes through a stuffing box 17 at that end of the casing 1. Power may be applied to the shaft 16 by any suitable means.

The rotor 8 is provided with a central diametrical guide-way or passage 17 which receives slidingly an automatically shifting pumping blade 18 of considerably greater length than the diameter of the rotor 8 as shown in Fig. 2. The blade 8 is formed of two sections as illustrated in Figs. 2 and 4, each of said sections being provided between the ends thereof with a transversely extending bar or rib 19. A spring 20 is interposed between the ribs 19 and acts to hold the extreme edges 21 of the blade in contact with the inner periphery of the casing 1. Lateral packing strips 22 are arranged in the spaces between the inner faces of the sections of the blade and are pressed outwardly by means of springs 23 into close liquid-tight contact with the side walls or heads 24 of the casing.

From the foregoing description taken in connection with the accompanying drawings it will now be seen that I have produced a very simple quick acting rotary or centrifugal pump adapted for a great number of purposes and uses. The pump comprises very few parts and these parts are of simple and inexpensive construction and may be easily renewed. The ball bearings 12 reduce the friction on the stud shaft 10 at one end of the rotor and if desired other ball bearings 26 may be placed around the power receiving shaft 16 which drives the rotor. One of the heads of the casing is made detachable as shown in Fig. 3 to give access to the parts contained within the casing.

I claim:—

In a rotary pump, in combination, a hollow casing of generally cylindrical formation, substantially semi-circular hoods arranged at opposite places and extending from the periphery of said casing and forming inlet and outlet chambers, the peripheral wall of the casing being formed with perforations affording communication between the interior of the casing and said inlet and outlet chambers, a rotor having an eccentric mounting in said casing and bearing at one point against the inner peripheral wall thereof, said rotor being formed with a diametrical slot extending therethrough, a pumping blade slidable in said slot in the rotor and having a length greater than the diameter of said rotor, said blade comprising two substantially plate-like sections slidable in relation to each other and formed on their adjacent faces with transversely extending ribs, yieldable means between said ribs for pressing the extreme edges of the sections into contact with the inner peripheral wall of the casing, and spring pressed lateral packing strips arranged between the sections of said blade and working in contact with the inner surfaces of the heads of the casing.

In testimony whereof I affix my signature.

GEORGE W. CONNOR.